United States Patent [19]

Watanabe

[11] Patent Number: 4,688,680
[45] Date of Patent: Aug. 25, 1987

[54] TOOL-MAGAZINE INDEXING DEVICE
[75] Inventor: Akira Watanabe, Kyoto, Japan
[73] Assignee: Mitsubishi Jukogyo Kabushiki Kaisha, Japan
[21] Appl. No.: 713,305
[22] Filed: Mar. 18, 1985

Related U.S. Application Data

[63] Continuation-in-part of Ser. No. 347,328, Feb. 9, 1982, abandoned.

[30] Foreign Application Priority Data

Feb. 21, 1981 [JP] Japan .................................. 56-24606

[51] Int. Cl.[4] ............................................... A47F 3/08
[52] U.S. Cl. ........................................ 211/1.5; 29/568
[58] Field of Search ...................... 211/1.5, 70.6, 121, 211/122; 29/568; 408/35

[56] References Cited

U.S. PATENT DOCUMENTS

| | | | |
|---|---|---|---|
| 3,587,165 | 6/1971 | Griffith | 211/1.5 X |
| 3,817,391 | 6/1974 | Lohneis et al. | 211/1.5 |
| 4,164,809 | 8/1979 | Tsuboi et al. | 29/568 |
| 4,426,763 | 1/1984 | Hornok et al. | 29/568 |
| 4,521,950 | 6/1985 | Kase et al. | 211/1.5 X |

Primary Examiner—Robert W. Gibson, Jr.
Assistant Examiner—Sarah A. Lechok Eley
Attorney, Agent, or Firm—McGlew and Tuttle

[57] ABSTRACT

There is provided a tool-magazine indexing device for rapidly indexing tools by the utilization of pressure oil, which comprises a tool-magazine housing a number of tools, a cylindrical feed-back shaft making one rotation in synchronization with one circumferential movement of the tool-magazine and a command input shaft inserted in the cylindrical feed-back shaft so as to rotate for indexing purposes corresponding to the number of the tools in the tool-magazine so that an indexing operation by the tool-magazine indexing device can be faciliated using a hydraulic pump and a hydraulic motor for driving the rotary driving shaft of the tool-magazine.

3 Claims, 13 Drawing Figures

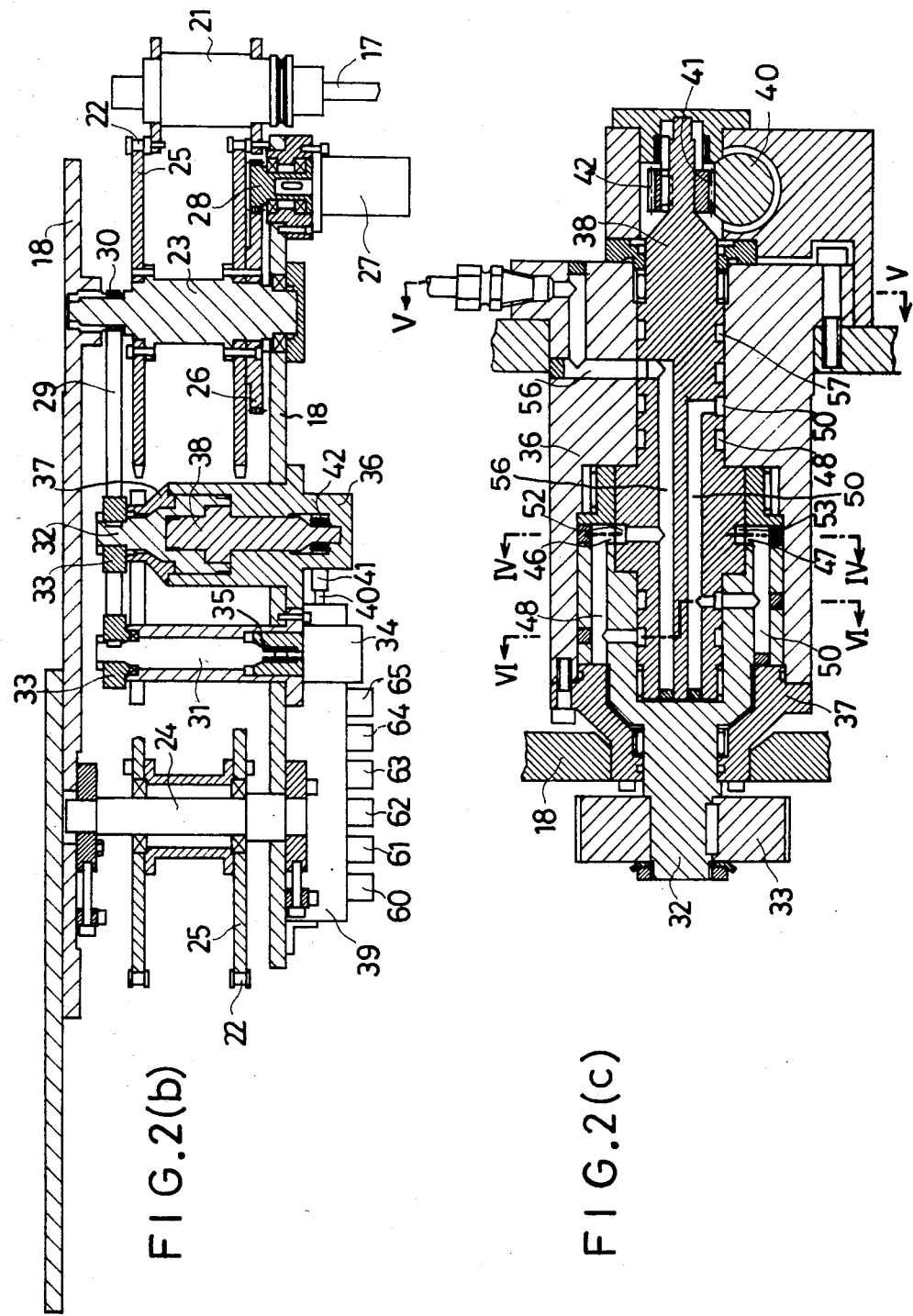

TOOL-MAGAZINE INDEXING DEVICE

CROSS-REFERENCE TO RELATED APPLICATIONS

This application is a continuation -in- part of Ser. No. 347,328 filed Feb. 9, 1982, now abandoned.

FIELD AND BACKGROUND OF THE INVENTION

The present invention relates to a tool-magazine indexing device for rapidly indexing tools by the utilization of pressure oil.

In machine tools fitted with tool exchange means, a tool indicated by a numerically controlled device is taken out from a tool-magazine and affixed to a main shaft by means of a tool exchange arm. In general, the tool-magazine is provided with tool-holding portions arranged at equal intervals on a disc or tool-holding members attached to a chain of definite pitch, and such a mechanism is combined with the tool-magazine as is capable of indexing and stopping the indicated tool in a tool exchange position by driving and rotating the disc or chain. The aforesaid tool-holding portions are provided with individual numbers which correspond to the tools housed in the tool-magazine. When one of the members is called by the numerically controlled device, a signal corresponding to said number is transmitted through the combination of each tool-holding portion and a corresponding limit switch dog fixed on the disc. When this signal coincides with the aforesaid called number from the numerically controlled device, the rotary driving of the disc or chain will stop and then the indexing of a tool becomes possible. Even in this case, however, it is impossible to stop the disc or chain immediately upon coincidence of the called number and the signal of the limit switch dog so that, in common practice, the rotary driving speed of the disc or chain must be reduced beforehand and a stop signal is transmitted just when the called number has coincided with the signal of the limit switch dog, thereby stopping the disc or chain in a permissible position. Due to this kind of mechanism, it has heretofore been customary to require that provision of a speed-reducing limit switch before an indexing position so as to transmit a speed-reducing signal.

In case the disc or chain is stopped in a specified position and another tool number is to be called, one set of speed-reducing limit switches is sufficient insofar as the direction of rotation of the disc or chain is always constant, but since no nearest possible rotation is allowed in such a case, it becomes necessary to drive the disc or chain for almost one circumferential rotation, thus requiring too much time of number calling and also waiting time. Moreover, in cases where a tool-magazine is attached to the main body of the machine tool, the driven vibrations of the disc or chain will be transmitted to a workpiece during a machining operation until its precisioned machining becomes impossible. In order to prevent such bad influence, the machining of the workpiece must be suspended halfway with the result of lowering the percentage of working efficiency. In the case of attempting to lessen the time of tool exchange by driving the disc or chain for the nearest possible circumferential rotation, it becomes necessary to provide two sets of speed-reducing limit switches at both sides of an indexing position and, in addition, a mechanism for determining the nearest possible rotation must be provided so that all the device becomes complicated in structure and at the same time, a considerable increase in cost cannot be avoided.

SUMMARY OF THE INVENTION

In view of all the aforesaid conventional drawbacks, the present invention has for its object to provide an indexing device of an entirely new structure capable of driving the disc or chain for the nearest possible rotation without requiring a mechanism for determining such nearest possible rotation.

In order to achieve this object, the tool-magazine indexing device of the present invention is constructed as described hereinafter. Namely, as the characteristics of the present invention, the tool-magazine indexing device comprises a tool-magazine housing a number of tools in an annular manner, a cylindrical feed-back shaft designed to make one rotation in synchronization with one circumferential movement of said tool-magazine, a command input shaft inserted in said cylindrical feed-back shaft, said command input shaft being adapted to make indexing rotations corresponding to the number of the tools housed in said tool-magazine, the inner circumferential surface of said feed-back shaft being formed with a pressure-oil supply opening and a pressure-oil discharge opening facing each other at an angle of 180°, said pressure-oil supply opening being capable of communicating with a hydraulic pump and said pressure-oil discharge opening being adapted to discharge pressure-oil from said pressure-oil supply opening outwardly, the outer circumferential surface of said command input shaft being formed with a pair of arc-shape grooves facing each other at an angle of 180° and being capable of communicating with said pressure-oil supply opening and said pressure-oil discharge opening respectively, the portions partitioning the pair of said grooves being formed as a pair of sealing portions to close said pressure-oil supply opening and said pressure-oil discharge opening and oil passages being formed in said command input shaft so as to communicate with a hydraulic motor for driving the rotary driving shaft of said tool-magazine and the pair of said grooves.

BRIEF DESCRIPTION OF THE DRAWINGS

The invention will be explained in detail with reference to a preferred embodiment incorporated in an upright machining center, as shown in the accompanying drawings wherein;

FIG. 2(b) and FIG. 2(c) are cross-sectional views of FIG. 2(a) taken along the lines II$_b$—II$_b$ and II$_c$—II$_c$ respectively.

DESCRIPTION OF THE PREFERRED EMBODIMENT

Figure 1A:
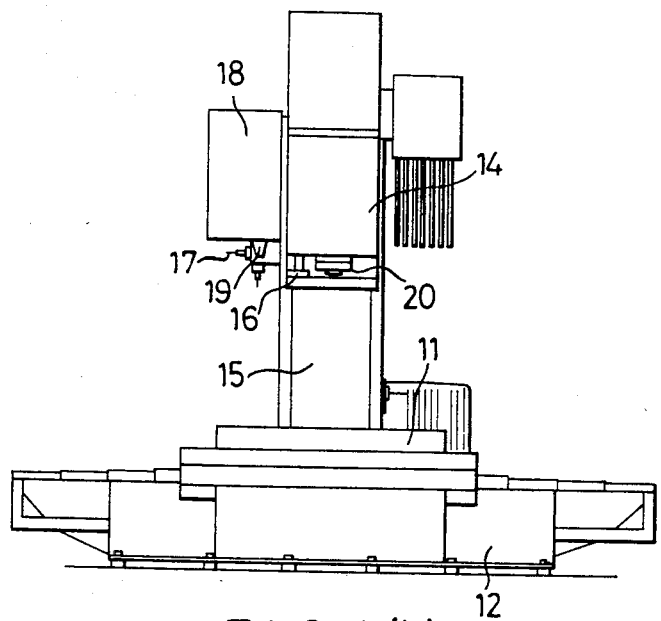
FIG. 1(a) is a front view of a preferred embodiment in which the tool-magazine indexing device of the present invention is applied to an upright machining center.
Figure 1B:
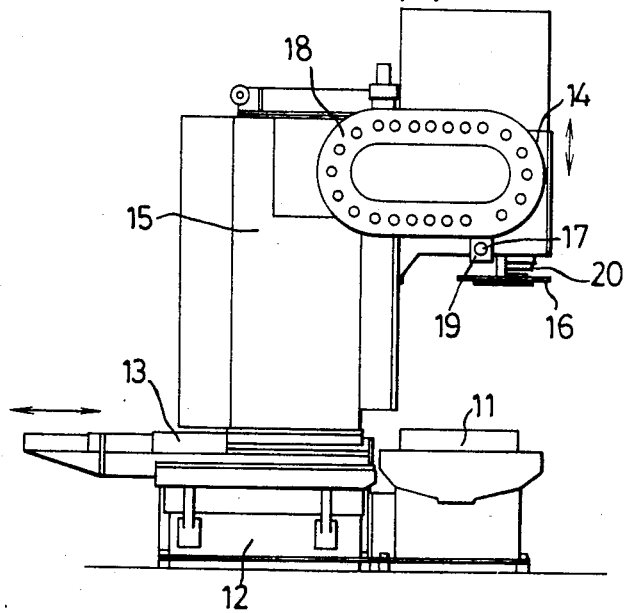
FIG. 1(b) is a side view thereof.

In the drawing, a saddle 13 is provided in the manner of horizontally moving to the right and left on a bed 12 which is disposed in parallel with a work table 11 for mounting a workpiece (not shown) thereon. On the saddle 13 is provided a column 15 also horizontally moving to the right and left in support of a main shaft head 14 adapted to move up and down. Between a tool exchange arm 16 attached to the main shaft head 14 and a tool magazine 18 disposed at the column 15 and housing a number of tools 17 is a tool intermediate station 19 incorporated in the column so as to act as an intermediary for handling the tool 17, i.e. in such a manner as the tool can be taken out downwardly from the tool magazine and the tool exchange arm 16 can act to return the tool 17 withdrawn from a main shaft 20 to the tool magazine 18.

Figure 2A:
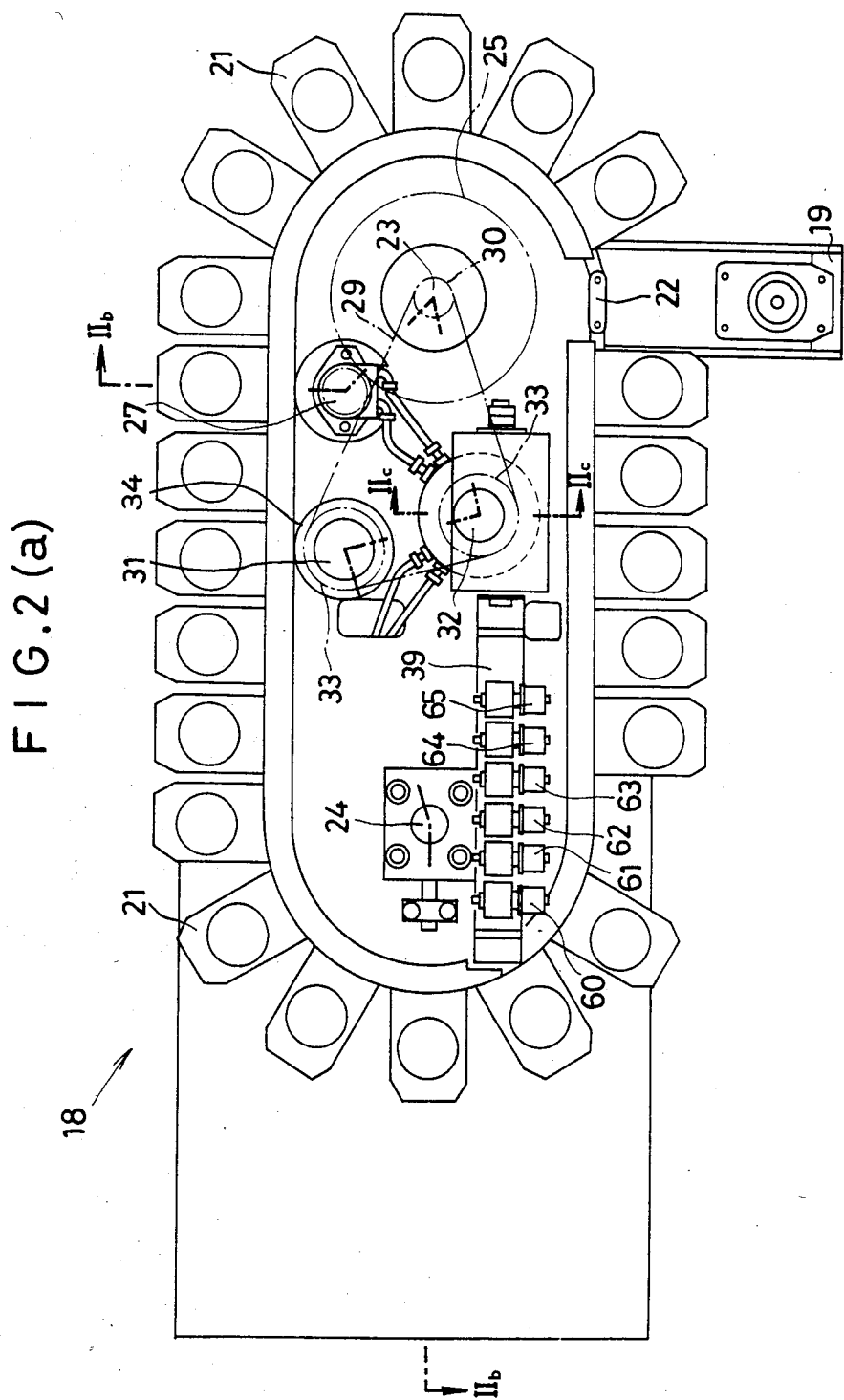
FIG. 2(a) is an enlarged view of the tool-magazine.

As shown in FIG. 2(a) and FIG. 2(b) illustrating the tool magazine 18 in an enlarged scale, a large number of sockets 21 receiving the tools 17 are secured to an endless chain 22 which is wound around sprockets 25—25 secured to a pair of driving and rotating shafts 23 and 24. Sockets 21 thus form a rotatable tool-magazine housing for the tools 17. Of the driving and rotating shafts 23 and 24 rotatably supported at the tool magazine 18, a driving gear 28 integral with a hydraulic motor 27 attached to the tool magazine is adapted to mesh with a transmission gear 26 of the driving and rotating shaft 23 provided with a driving pulley 30 with winding of a timing belt 29. The timing belt 29 is also wound around a transmission pulley 33 integral with both an index-detecting rotary shaft 31 and a cylindrical feed-back shaft 32 rotatably supported at the tool-magazine 18. In this case, the diameters of the driving pulley 30 and the transmission pulley 33 are designed such that when the endless chain 22 makes one circumferential rotation, the index-position detecting rotary shaft 31 and the feedback shaft also make one circumferential rotation in synchronization with the endless chain 22. The index-position detecting rotary shaft 31 is combined with a rotary encorder 34 for detecting the rotation-index position of the socket 21 through a coupling 35 so as to determine which tool 17 is facing the tool intermediate station 19.

As shown in FIG. 2(c) illustrating the feed-back shaft 32 in an enlarged view, the feed-back shaft 32 is rotatably supported for a housing 36 and a cover 37 of the tool-magazine 18. One end of a command input shaft 38 is inserted in the feed-back shaft 32 so that it can rotate freely from the feed-back shaft 32 and the housing 36. The other end of the command input shaft 38 is provided with an index gear 42 for meshing with a rack 41 formed on a piston rod 40 of a digital cylinder 39 (See FIG. 3) attached to the tool-magazine 18.

Figure 3:
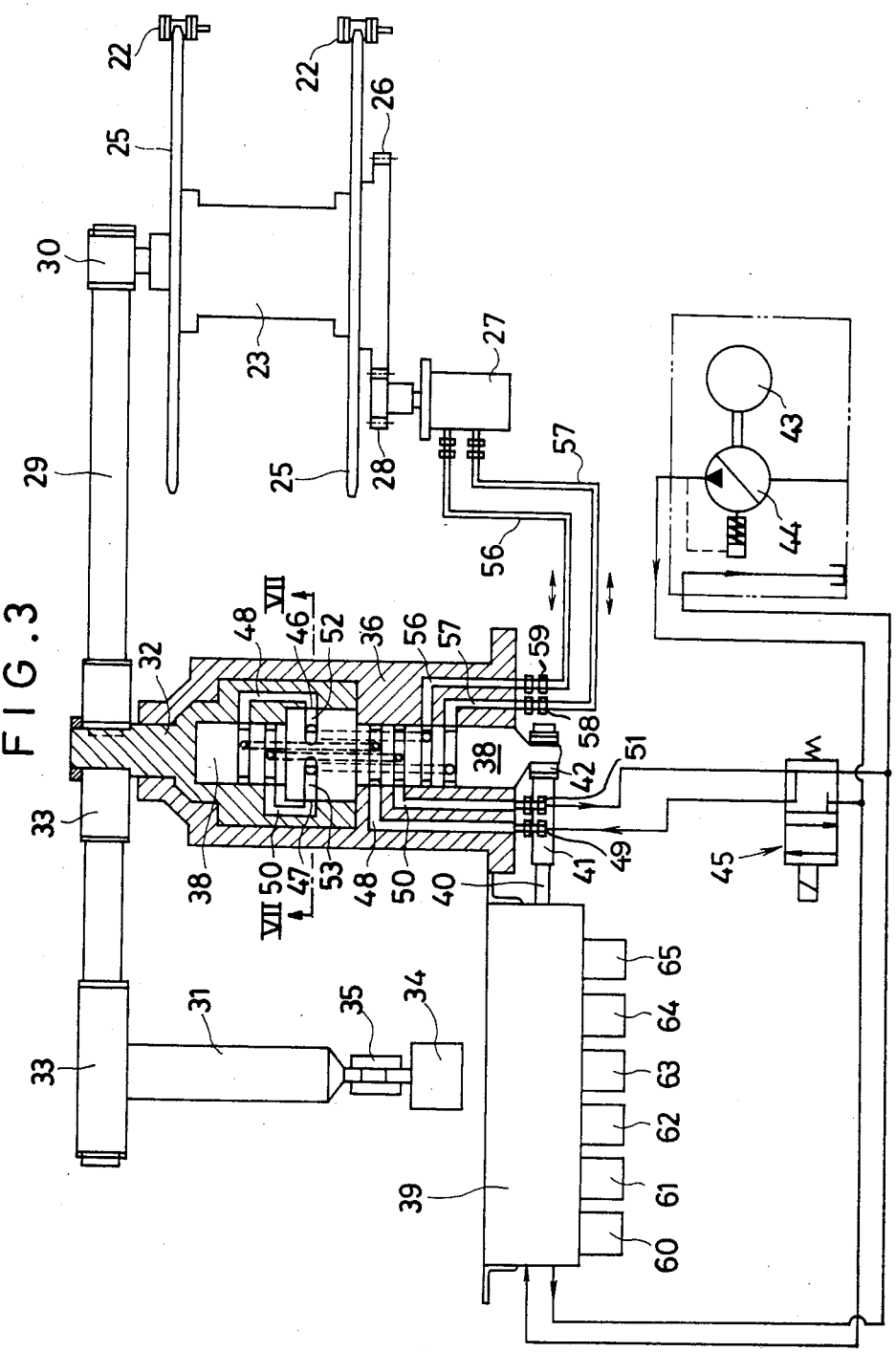
FIG. 3 is a hydraulic circuit view.
Figure 4:
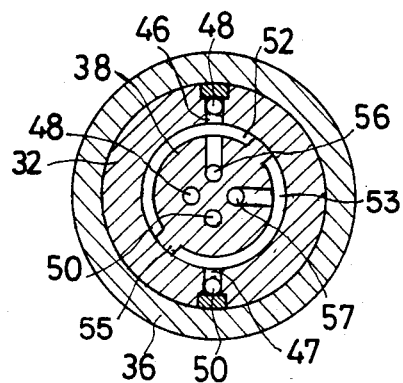
FIGS. 4, 5 and 6 are cross-sectional views of FIG. 2(c) taken along the lines IV—IV, V—V and VI—VI respectively
Figure 5:
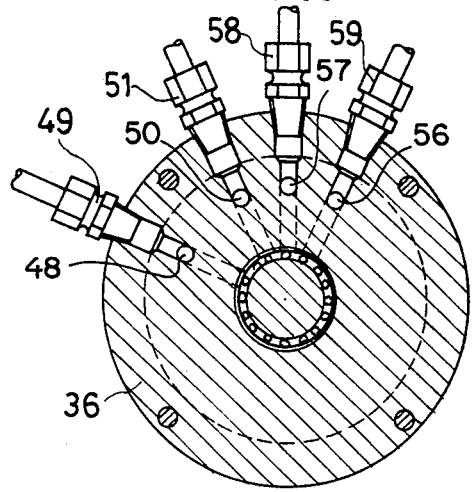
Figure 6:
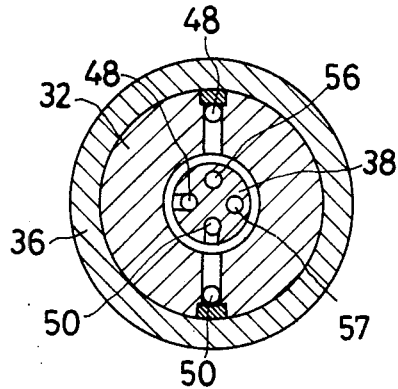

As shown in FIGS. 3, 4 and 6, the internal surface of the feed-back shaft 32 in engagement with the external circumferential surface of the command input shaft 38 is formed with a pressure oil supply opening 46 for connection with a hydraulic pump 44 adapted to be actuated by a motor 43 through an electromagnetic valve 45 and also with a pressure oil discharge opening 47 facing the pressure oil supply opening 46 at an angle of 180° and adapted to communicate outside through the electromagnetic valve 45. As shown in FIG. 3, a pressure oil supply passage 48 in communication with the pressure oil supply opening 46 is formed in the feed-back shaft 32, command input shaft 38 and housing 36 and connected to the electromagnetic valve 45 through a fluid coupling 49. A pressure oil discharge passage 50 in communication with the pressure oil discharge opening 47 is formed in the feed-back shaft 32, command input shaft 38 and housing 36 and connected to the electromagnetic valve 45 through a fluid coupling 51. A pair of arc-shape grooves 52 and 53 are formed on the external circumferential surface of the command input shaft 38 in engagement with the internal circumferential surface of the feed-back shaft 32 so as to face each other at an angle of 180° and to communicate with the pressure oil supply opening 46 and the pressure oil discharge opening 47. The portions of the command input shaft 38 serve as sealing portions 54, 55 to close the oil pressure supply opening 46 and oil pressure discharge opening 47. In the command input shaft 38 and the housing 36 are formed a pair of oil passages 56 and 57 in communication with the grooves 52 and 53 which are connected to the fluid or hydraulic motor 27 through fluid couplings 58 and 59.

The digital cylinder 39 serves to give the command input shaft 38 indexing rotations of the same number as that of the tools housed in the tool-magazine 18. According to the preferred embodiment, the moving stroke of the piston rod 40 is controlled by the combination of actions of 6 electromagnetic valves 60–65. Namely, in order that every stroke of the piston rod 40 be differentiated at the time of excitation of the individual electromagnetic valves, an input operation by binary-coded decimal notation and binary scale or dyadicsystem is carried out to give rotation to the command input shaft 38. In this case, on the supposition that the minimum unit stroke of the piston rod 40 of the digital cylinder 39 necessary for one-time indexing of the tool-magazine 18 is defined as S, the diameter of pitch circle of the indexing gear 42 of the command input shaft 38 as d and the number of the total indexes as N respectively, there follows the formula $S = (\pi d/N)$ as sufficient condition (wherein $\pi$ is the circular constant).

Likewise, in the case of input by binary-coded decimal notation, on the supposition that the strokes of the piston rod 40 at the time of excitation of the electromagnetic valves 60–65 are defined as 1S, 2S, 4S, 8S, 10S and 20S, the 17th index, for example, can be obtained by exciting the electromagnetic valves 60, 61, 62 and 64 at a time.

Figure 7A:
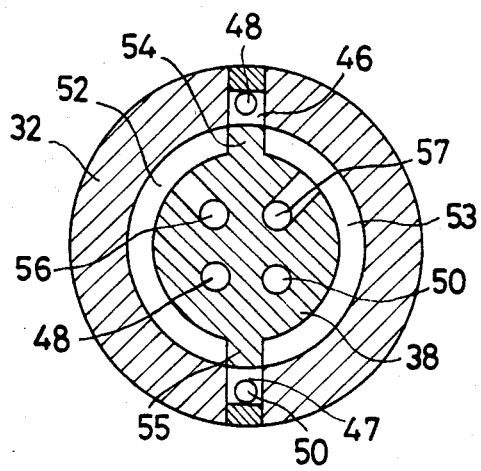
FIGS. 7(a) to 7(d) are views showing the operational steps of indexing according to the preferred embodiment and taken generally along the lines VII—VII of FIG. 3.

As shown in FIG. 7(a), in the case of a constant indexing position, the sealing portions 54 and 55 are designed to close the pressure oil supply opening 46 and the pressure oil discharge opening 47 and the electromagnetic valve 45 is closed. When an indexing operation is begun, the command input shaft 38 is rotated for the required indexing angle and then stopped. (See FIG. 7(b)). Then the electromagnetic valve 45 is opened, pressure oil from the pressure oil pump 44 is allowed to flow into the the groove 52 through the pressure oil passage 46, passing through the oil passage 56 and flowing into the groove 53 from the pressure oil motor 27 after passing through the oil passage 57 and then returning to the side of the electromagnetic valve 45 through the pressure oil discharge opening 47 and pressure oil discharge passage 50. Owing to this formation of oil flow, the pressure oil motor 27 is actuated in one direction and the rotary driving shaft 23 is caused to start running upon which the endless chain 22 and the timing belt 29 start to move. Consequently, the feed-back shaft 32 with winding of the timing belt 29 also starts rotating and then all the device keeps running until such a condition is reached as the flow of pressure oil from the pressure oil supply opening 46 can be interrupted by means of the sealing portion 54 as shown in FIG. 7(d). When the condition of FIG. 7(d) is reached, output of the rotary encorder 34 coincides with an input signal to the electromagnetic valves 61–65 to complete the indexing operation but since pressure oil from the pressure oil supply opening 46 is destined to flow into the nearer oil passages 56 and 57, the feed-back shaft 32 is sure to move in a nearer manner. By the way, a pulse motor or the like may be used in the indexing process of the command input shaft 38.

Figure 7B:
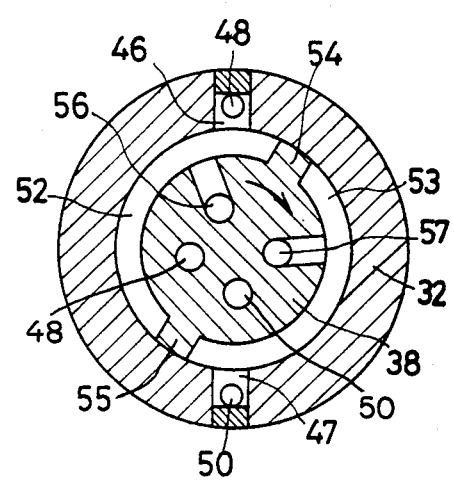
Figure 7C:
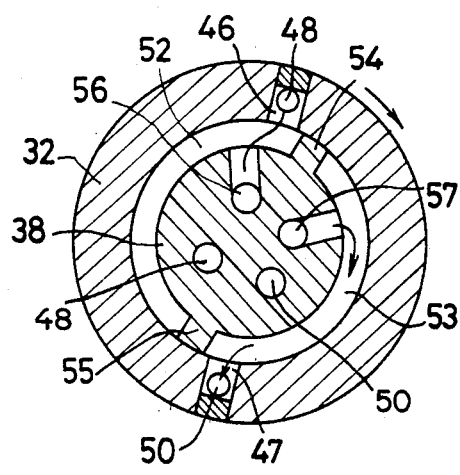
Figure 7D:
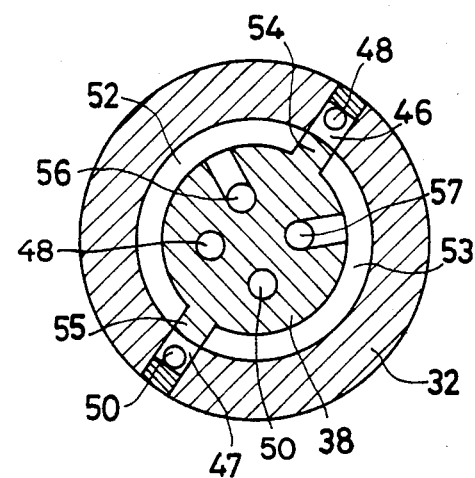

If the command input shaft 37 is rotated in an opposite direction from that shown between FIGS. 7(a) and 7(b), oil will flow in an opposite direction through hydraulic motor 27 which causes rotation of the tool magazine chain in an opposite direction to rotate feed-back shaft 32 in an opposite direction (from that shown in FIG. 7(c)). Hydraulic motor 27 thus has two inputs at oil passages 56 and 57 which can effect rotation of the tool magazine housing in both clockwise and counter-clockwise directions.

Thus, according to the tool-magazine indexing device of the present invention, the feed-back shaft is caused to move together with the tool-magazine following the command input shaft which has been rotated for indexing purposes previously by the utilization of pressure oil flow, and a speed-reducing mechanism or the like can be entirely omitted and a high-speed indexing effect can be obtained along with the possibility of nearer rotation of the feedback shaft.

What is claimed is:

1. A tool-magazine indexing device which comprises:
   a tool-magazine housing adapted to receive a number of tools fitting within said tool-magazine having a rotatable housing in an annular manner;
   a shaft housing;
   a cylindrical feed-back shaft rotatably mounted in said shaft housing;
   rotation means synchronized to the rotation of said toolmagazine housing so that one rotation of said tool-magazine housing results in one rotation of said cylindrical feed-back shaft;
   a command input shaft fitting rotatably within said cylindrical feed-back shaft;
   means for rotating said command input shaft, said means for rotating said command input shaft being capable of rotating said command input shaft for a specific angular displacement in proportion to the location of a tool of said number of tools located within said tool-magazine housing;
   a fluid dsitribution system within said cylindrical feedback shaft and said command input shaft having a fluid supply opening and a fluid supply exhaust opening disposed one another formed within said cylindrical feed-back shaft;
   a pair of arcuate shaped grooves formed within said command input shaft opposite each other and being capable of communicating with said fluid supply opening and said fluid supply exhaust;
   separating means on said command input shaft separating said pair of arc shaped grooves, said separating means being formed to be capable of sealing said fluid supply opening and said fluid supply exhaust opening, when aligned therewith;
   fluid passage means within said cylindrical feed-back shaft and said command input shaft disposed so that fluid will flow into one of said pair of arc-shaped grooves and out the other of said pair of arc-shaped grooves;
   and a fluid motor having two inputs, one of said inputs for controlling clockwise rotation and another of said inputs for controlling counter-clockwise rotation, said motor being drivingly connected to said tool-magazine housing for effecting rotation thereof, and said motor being controlled by the direction of fluid flow thereto.

2. A tool-magazine indexing device comprising a tool-magazine housing adapted to contain a number of tools disposed in an annular manner, a cylindrical feedback shaft designed to make one revolution in synchronization with one circumferential movement of the tool magazine, a command input shaft inserted in the cylindrical feed-back shaft, said command input shaft being adapted to make an indexing rotation corresponding to the number of tools housed in the tool-magazine housing, said feed-back shaft having an inner circumferential surface, said inner circumferential surface of the feed-back shaft being formed with a pressure oil supply opening and a pressure oil discharge opening oppositely disposed relative to said pressure oil supply opening, a hydraulic pump, said pressure oil supply opening and said pressure oil discharge opening being connected in communication with said hydraulic pump, said command input shaft having an outer circumferential surface, said outer circumferential surface of said command input shaft being formed with a pair of arcuate shaped grooves facing each other and adapted to communicate with said pressure oil supply opening and pressure oil discharge opening respectively, separating means on said command input shaft separating said pair of grooves, said separating means forming a pair of sealing portions adapted to close said pressure oil supply opening and said pressure oil discharge opening when said sealing portions are disposed in alignment with said oil supply opening and oil discharge opening respectively, a hydraulic motor, and oil passages formed in said command input shaft so as to communicate with said hydraulic motor and said pair of grooves, and a rotary driving shaft connected to said hydraulic motor for effecting the drive of said tool-magazine housing.

3. A tool-magazine indexing device according to claim 1, wherein said two inputs of said fluid motor are connected to said fluid passage means for receiving and discharging fluid from and to said fluid passage means.

* * * * *